(12) United States Patent
Suzuka et al.

(10) Patent No.: US 9,205,369 B2
(45) Date of Patent: Dec. 8, 2015

(54) ADSORPTION AND RELEASE DEVICE OF CARBON DIOXIDE

(75) Inventors: Michio Suzuka, Osaka (JP); Takeyuki Yamaki, Nara (JP); Takashi Sekiguchi, Osaka (JP); Ryo Kamai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 288 days.

(21) Appl. No.: 13/817,905

(22) PCT Filed: Apr. 16, 2012

(86) PCT No.: PCT/JP2012/002629
§ 371 (c)(1),
(2), (4) Date: Feb. 20, 2013

(87) PCT Pub. No.: WO2012/144189
PCT Pub. Date: Oct. 26, 2012

(65) Prior Publication Data
US 2013/0145935 A1 Jun. 13, 2013

(30) Foreign Application Priority Data
Apr. 21, 2011 (JP) .................................. 2011-095181

(51) Int. Cl.
*B01D 53/14* (2006.01)
*B01D 53/32* (2006.01)
(Continued)

(52) U.S. Cl.
CPC ............. *B01D 53/1425* (2013.01); *B01J 20/20* (2013.01); *B01J 20/205* (2013.01); *B01J 20/262* (2013.01);
(Continued)

(58) Field of Classification Search
None
See application file for complete search history.

(56) References Cited

U.S. PATENT DOCUMENTS

2008/0286643 A1* 11/2008 Iwasaki ......................... 429/111
2011/0083968 A1* 4/2011 Gilliam et al. ................. 205/555

FOREIGN PATENT DOCUMENTS

CN 201799208 U 4/2011
JP 4-271814 9/1992
(Continued)

OTHER PUBLICATIONS

Translation of JP 2002239373 A, accessed Mar. 11, 2015.*
(Continued)

*Primary Examiner* — Duane Smith
*Assistant Examiner* — Phillip Shao
(74) *Attorney, Agent, or Firm* — Hamre, Schumann, Mueller & Larson, P.C.

(57) ABSTRACT

An object of the present invention is to provide a carbon dioxide adsorption and release device, which has high adsorptivity, and also consumes low energy upon adsorption and desorption. The carbon dioxide adsorption and release device is characterized by including a pair of electrodes (electrode 1 and electrode 2) provided opposite to each other; an electrolyte 3 filled between the respective electrodes 1 and 2 of the pair of electrodes; and a porous body 4 provided on the electrode 1 of the pair of electrodes, wherein the electrolyte 3 absorbs carbon dioxide thereby dissolving the carbon dioxide therein, and thus enabling formation of carbonic acid ions or hydrogen carbonate ions; and the carbonic acid ions or hydrogen carbonate ions are electrostatically adsorbed on a surface of the porous body 4 when a forward voltage is applied to the pair of electrodes by the porous body 4, and the carbonic acid ions or hydrogen carbonate ions are electrostatically released from a surface of the porous body 4 when a backward voltage is applied to the pair of electrodes.

14 Claims, 1 Drawing Sheet

(51) Int. Cl.
  *C08G 73/02* (2006.01)
  *C08G 73/06* (2006.01)
  *C08L 79/02* (2006.01)
  *C08L 79/04* (2006.01)
  *C01B 31/24* (2006.01)
  *B01J 20/20* (2006.01)
  *B01J 20/26* (2006.01)
  *B01J 20/34* (2006.01)

(52) U.S. Cl.
  CPC ............ *B01J 20/3441* (2013.01); *C01B 31/24* (2013.01); *C08G 73/0266* (2013.01); *C08G 73/0627* (2013.01); *C08L 79/02* (2013.01); *C08L 79/04* (2013.01); *Y02C 10/06* (2013.01)

(56) References Cited

FOREIGN PATENT DOCUMENTS

| | | |
|---|---|---|
| JP | 4-290526 | 10/1992 |
| JP | 5-230210 | 9/1993 |
| JP | 6-210131 | 8/1994 |
| JP | 7-39752 | 2/1995 |
| JP | 11-114353 | 4/1999 |
| JP | 2002-239373 | 8/2002 |
| JP | 2002239373 A * | 8/2002 |
| JP | 2003-306788 | 10/2003 |
| JP | 2004-73978 | 3/2004 |
| JP | 2004-174370 | 6/2004 |
| JP | 2007-70384 | 3/2007 |
| WO | WO 2011024321 A1 * | 3/2011 |

OTHER PUBLICATIONS

Translation of WO 2011024321 A1, accessed Mar. 12, 2015.*
Tao et al.: "Advances in Electrochemical Reduction of Carbon Dioxide"; Chemistry, 2001, No. 5, pp. 272-277 with English Abstract.
Zhang et al.: "Research on Modern $CO_2$ Absorption Process"; Contemporary Chemical Industry, 2011, vol. 40, No. 1, pp. 88-91 with English Abstract.

* cited by examiner

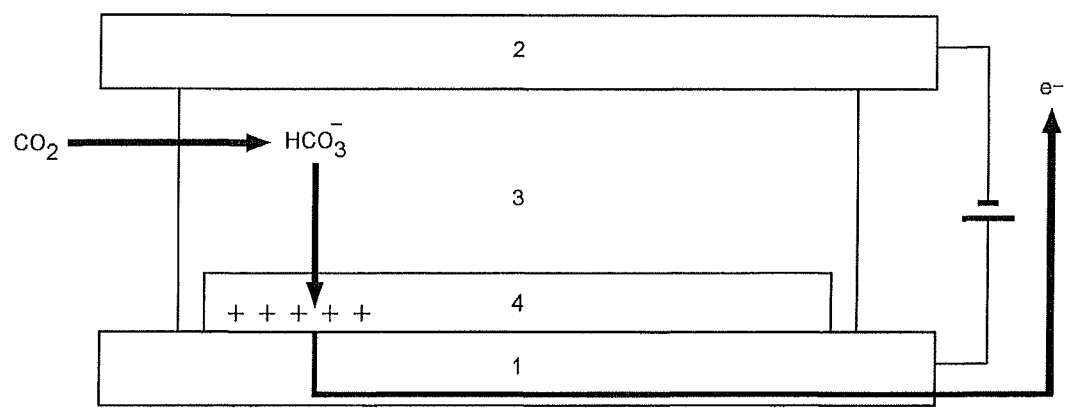

ADSORPTION AND RELEASE DEVICE OF CARBON DIOXIDE

BACKGROUND OF THE INVENTION

1. Field of the Invention

The present invention relates to a device which is capable of electrochemically adsorbing and releasing carbon dioxide.

2. Description of the Related Art

Carbon dioxide is a substance existing widely on the earth, which accounts for 0.04% of the atmosphere, and is a compound which is widely used in the industry. Specific examples of the industrial use of carbon dioxide include a foaming gas of carbonated beverages, bath additives, and fire extinguishing compositions, dry ice for cooling, and air for emergency replenishment of bicycles. Carbon dioxide in a supercritical state is used as a solvent for extraction of caffeine, and is also used in a laser used for processing in the industrial field, and a carbonic acid gas laser used as a medical laser knife. Carbon dioxide is also used as a substitute for a chlorofluorocarbon-based refrigerant in a $CO_2$ refrigerant compressor.

In the agriculture, carbon dioxide is also used in a forcing culture (cultivation of out-of-season crops with artificial heat or light) of strawberries, and carbon dioxide fertilization which accelerates the growth of plants such as aquatic plants in ornamental aquaria, and is also used in controlled atmosphere storage (CA storage) of fresh agricultural products.

As mentioned above, carbon dioxide has been used widely and commonly. However, there has hitherto been used mainly, as technology of storing carbon dioxide, compression/adsorption technology of compressing and adsorbing carbon dioxide using zeolite as disclosed in JP 7-39752 A, or technology of adsorbing carbon dioxide using an alkaline liquid or semiliquid as disclosed in JP 11-114353 A, and there was not a device which consumes low energy and also can perform adsorption and desorption of carbon dioxide without requiring a large-scale apparatus.

Patent Document 1: JP-7-39752 A
Patent Document 2: JP-11-114353 A

The solutions reported in the prior art documents had a problem that large energy is required for application of heat in the case of adsorption and desorption, and thus failing to reconcile adsorption/desorption performances and low energy consumption.

SUMMARY OF THE INVENTION

The present invention has been made in view of the above circumstances, and an object thereof is to provide a carbon dioxide adsorption and release device, which has high adsorptivity, and also consumes low energy upon adsorption and desorption.

In order to achieve the above object, the carbon dioxide adsorption and release device according to the present invention is characterized by including a pair of electrodes 1, 2 provided opposite to each other; an electrolyte 3 filled between the respective electrodes 1, 2 of the pair of electrodes; and a porous body 4 provided on one electrode 1 of the pair of electrodes, wherein the electrolyte 3 absorbs carbon dioxide thereby dissolving the carbon dioxide therein, and thus enabling formation of carbonic acid ions or hydrogen carbonate ions; and the carbonic acid ions or hydrogen carbonate ions are electrostatically adsorbed on a surface of the porous body 4 when a forward voltage is applied to the pair of electrodes 1, 2 by the porous body 4, and the carbonic acid ions or hydrogen carbonate ions are electrostatically released from a surface of the porous body 4 when a backward voltage is applied to the pair of electrodes.

As used herein, forward voltage application means that a positive electrode of a DC power supply is connected to an electrode 1 and a negative electrode of a DC power supply is connected to an electrode 2, and a voltage is applied in a carbon dioxide adsorption and release device including a pair of electrodes 1, 2 provided opposite to each other, an electrolyte 3 filled between the electrodes 1, 2, and a porous body 4 provided on one electrode 1 of the pair of electrodes. In contrast, backward voltage application means that a negative electrode of a DC power supply is connected to an electrode 1 and a positive electrode of a DC power supply is connected to an electrode 2, and then a voltage is applied, in the above configuration.

In the carbon dioxide adsorption and release device according to the present invention, it is preferred that the porous body 4 includes a unit A which is reversibly oxidizable and reducible by application of a voltage to a pair of electrodes 1, 2, and also either an oxidation state or a reduction state of the unit A is an organic polymer which becomes a cationic state.

In the carbon dioxide adsorption and release device according to the present invention, it is preferred that the porous body 4 is a polymer gel which swells in the electrolyte.

In the carbon dioxide adsorption and release device according to the present invention, it is particularly preferred that, in the porous body 4 composed of the polymer gel, the unit A is represented by the following structure formula (Chemical Formula 1 or Chemical Formula 2).

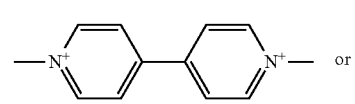

[Chemical Formula 1] or

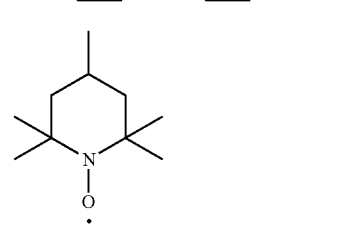

[Chemical Formula 2]

In the carbon dioxide adsorption and release device according to the present invention, the porous body 4 is represented by the following structure formula (Chemical Formula 3 or Chemical Formula 4).

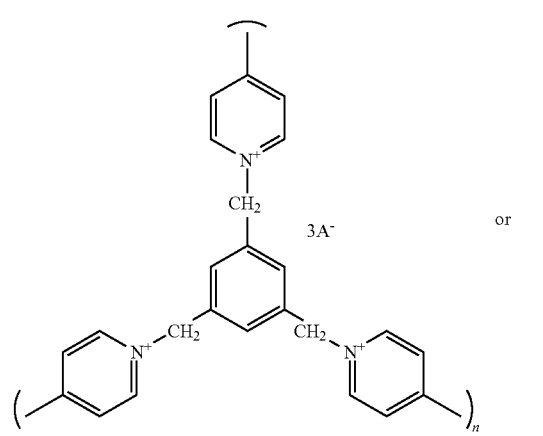

[Chemical Formula 3]

or

[Chemical Formula 4]

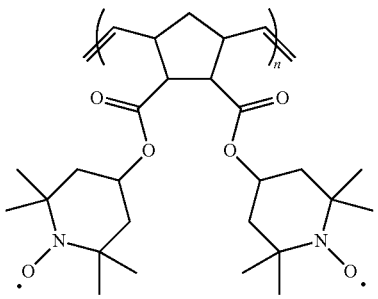

In the carbon dioxide adsorption and release device according to another aspect of the present invention, the porous body 4 is a conductive polymer porous body.

In the carbon dioxide adsorption and release device according to the present invention, it is particularly preferred that, in the porous body 4, the unit A is polyaniline represented by the following structure formula (Chemical Formula 5).

[Chemical Formula 5]

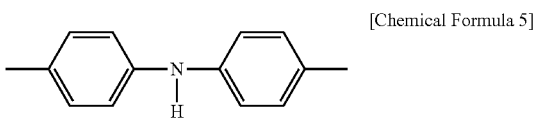

In the carbon dioxide adsorption and release device according to still another aspect of the present invention, the porous body 4 is a conductive inorganic porous body.

In the inorganic porous body of the carbon dioxide adsorption and release device according to the present invention, it is particularly preferred that the unit A is graphene.

The conductive inorganic porous body is at least one selected from the group consisting of a graphite, a carbon nanotube, and a carbon fiber.

In the carbon dioxide adsorption and release device according to the present invention, it is preferred that the unit A included in the porous body 4 has a density of 0.0002 mol/g to 0.02 mol/g.

In the carbon dioxide adsorption and release device according to the present invention, a solvent of the electrolyte is water.

In the carbon dioxide adsorption and release device according to the present invention, the electrolyte contains a supporting electrolyte salt.

In the carbon dioxide adsorption and release device according to the present invention, it is preferred that a cation of the supporting electrolyte salt has a molecular weight of 1,000 or more.

In the carbon dioxide adsorption and release device according to the present invention, it is preferred that an anion of the supporting electrolyte salt has a molecular weight of 1,000 or more.

According to the present invention, a carbon dioxide adsorption and release device includes a pair of electrodes provided opposite to each other; an electrolyte filled between the respective electrodes of the pair of electrodes; and a porous body provided on one electrode of the pair of electrodes, wherein the electrolyte absorbs carbon dioxide thereby dissolving the carbon dioxide therein, and thus enabling formation of carbonic acid ions or hydrogen carbonate ions; and the carbonic acid ions or hydrogen carbonate ions are electrostatically adsorbed on a surface of the porous body when a forward voltage is applied to the pair of electrodes by the porous body, and the carbonic acid ions or hydrogen carbonate ions are electrostatically released from a surface of the porous body when a backward voltage is applied to the pair of electrodes. Therefore, storage and release of carbon dioxide are electrochemically controlled by applying a forward voltage and a backward voltage to electrodes 1, 2. Adsorption and release of carbon dioxide are performed by application of a voltage and large energy required for application of heat is not required, and thus enabling low energy consumption and excellent adsorption/desorption performances.

Thus, according to the present invention, it is possible to provide a carbon dioxide adsorption and release device which has high adsorptivity and also consumes less energy upon adsorption and desorption.

BRIEF DESCRIPTION OF THE DRAWINGS

FIG. 1 is a schematic sectional view showing an embodiment of the present invention.

DETAILED DESCRIPTION OF THE INVENTION

An example of a carbon dioxide adsorption and release device is shown in FIG. 1. The carbon dioxide adsorption and release device is provided with a pair of electrodes (electrode 1, electrode 2), an electrolyte 3, and a porous body 4. The electrode 1 and the electrode 2 are spaced from each other and disposed opposite to each other, and the electrolyte 3 and the porous body 4 exist between the electrode 1 and the electrode 2. The electrolyte 3 exists in contact with the porous body 4, the electrolyte 3 exists in contact with the electrode 2, and the porous body 4 exists in contact with the electrode 1 so as to be capable of giving or receiving electrons and holes.

The electrode 1 is connected with electric devices such as an external power supply, a secondary battery, and a capacitor, and can apply a charge/discharge treatment to the carbon dioxide adsorption and release device. The electrode 1 functions as a negative electrode (anode) of the carbon dioxide adsorption and release device.

The electrode 1 and the electrode 2 may be formed of a single membrane of a conductive material, or may be formed by lamination of conductive materials on a base material. Examples of the conductive material are preferably metals such as platinum, gold, silver, copper, aluminum, rhodium, and indium; carbon; conductive metal oxides such as indium-tin complex oxide, tin oxide doped with antimony, and tin oxide doped with fluorine; composites of the metals and compounds; and materials in which silicon oxide, tin oxide, titanium oxide, zirconium oxide, and aluminum oxide are coated on the metals and compounds.

The lower the surface resistance of the electrode 1, the better it is. The surface resistance is preferably 200Ω/□ or less, and more preferably 50Ω/□ or less. When the surface resistance is 200Ω/□ or less, voltage loss of electrode 1 in the device of the present invention may decrease, and thus enabling driving of the device at low voltage. When the surface resistance is 50Ω/□ or less, the effect may be further improved, and thus enabling driving of the device at lower voltage. There is no particular limitation on the lower limit of the surface resistance, and it is usually 0.1Ω/□. When the surface resistance is 0.1Ω/□ or more, it may be possible to reconcile availability of the electrode and low voltage drive of the device.

When the electrode 1 is formed by depositing transparent conductive oxides such as indium oxide, tin oxide, and zinc oxide on a base material, for example, vacuum processes such as a sputtering process and a vacuum vapor deposition process can be employed on a substrate. Wet type methods such as a spin coating method, a spraying method, and a screen printing method may also be employed.

The electrode 2 functions as a positive electrode (cathode) of the carbon dioxide adsorption and release device. The electrode 2 may be formed from the material similar to the case of the electrode 1 using the method similar to the case of the electrode 1.

It is preferred that the electrode 2 is composed of a material having a catalyst function capable of giving electrons to a reductant in the electrolyte 3 so that the electrode 2 efficiently acts as the positive electrode of the carbon dioxide adsorption and release device. Examples of the material include metals such as platinum, gold, silver, copper, aluminum, rhodium, and indium; carbon materials such as graphite, carbon nanotube, and carbon including platinum supported thereon; conductive metal oxides such as indium-tin oxide, tin oxide doped with antimony, and tin oxide doped with fluorine; and conductive polymers such as polyethylenedioxythiophene, polypyrrole, and polyaniline. Of these materials, platinum, graphite, and polyethylenedioxythiophene are particularly preferable.

The electrolyte 3 comprises a solvent and an electrolyte. It is preferred that the electrolyte exists in a state of being dissolved in the solvent. The electrolyte is added so as to enhance an ionic conductivity of the solvent, and the solvent serves as a medium which enables dissolution of carbon dioxide, and thus adsorbing to or desorbing from the porous body 4. The solvent is filled into or causes swelling of the porous body 4 to form a device.

The solvent is preferably a compound which is electrochemically stable and has a wide potential window. Both an aqueous solvent and an organic solvent can be used as the solvent. Examples of the solvent include water; carbonate compounds such as dimethyl carbonate, diethyl carbonate, methyl ethyl carbonate, ethylene carbonate, and propylene carbonate; ester compounds such as methyl acetate, methyl propionate, and γ-butyrolactone; ether compounds such as diethylether, 1,2-dimethoxyethane, 1,3-dioxosilane, tetrahydrofuran, and 2-methyl-tetrahydrofuran; heterocyclic compounds such as 3-methyl-2-oxazolidinone and 2-methylpyrrolidone; nitrile compounds such as acetonitrile, methoxyacetonitrile, and propionitrile; and aprotic polar compounds such as sulfolane, dimethyl sulfoxide, and dimethylformamide. These solvents can be used alone, or a mixture of two or more kinds of solvents can be used. Of these solvents, preferable solvents are carbonate compounds such as ethylene carbonate and propylene carbonate; heterocyclic compounds such as γ-butyrolactone, 3-methyl-2-oxazolidinone, and 2-methylpyrrolidone; and nitrile compounds such as acetonitrile, methoxyacetonitrile, propionitrile, 3-methoxypropionitrile, valeric acid nitrile. When two or more kinds of these solvents are mixed, water is preferably mixed from the viewpoint of formation of carbonic acid hydrogen anions.

The solvent may contain an ionic liquid (an ion liquid), or may be composed of only the ionic liquid. In this case, non-volatility and flame retardancy of the electrolyte 3 are improved. Examples of the ionic liquid include the whole well-known conventional ionic liquids, for example, imidazolium-based, pyridine-based, alicyclic amine-based, aliphatic amine-based, and azoniumamine-based ionic liquids; and ionic liquids each having a structure disclosed in EP 718288; WO 95/18456, Denkikagaku (which means Electrochemistry), Vol. 65, No. 11, page 923 (1997); J. Electrochem. Soc. Vol. 143, No. 10, page 3099 (1996); and Inorg. Chem. Vol. 35, page 1168 (1996). When the solvent has sufficient ionic conductivity, the electrolyte may not exist.

The electrolyte may be gelled or immobilized, or may be formed from a gelled electrolyte or a polyelectrolyte. Examples of a gelling agent used for gelling of the electrolyte include a polymer, a gelling agent using a polymer crosslinking reaction, a polymerizable polyfunctional monomer, and an oil gelling agent. It is possible to apply, as the gelled electrolyte and polyelectrolyte, substances which are commonly used. The electrolyte is preferably, for example, a vinylidene fluoride-based polymer such as polyvinylidene fluoride, an acrylic polymer such as polyacrylic acid, an acrylonitrile-based polymer such as polyacrylonitrile, a polyether-based polymer such as polyethylene oxide, and a compound having an amide unit in the structure.

The electrolyte 3 may contain a stably oxidizable and reducible redox (oxidation-reduction) structure material. The redox constituent material means a pair of materials which reversibly exist in the form of an oxidation state and a reduction state in a redox (oxidation-reduction) reaction. Examples of the redox constituent material include solutions prepared by dissolving a redox (oxidation-reduction) couple in a solvent; solid electrolytes such as a molten salt, a p-type semiconductor such as copper iodide; amine derivatives such as triphenylamine, and conductive polymers such as polyacetylene, polyaniline, and polythiophene.

Specific examples of the redox constituent material include, but are not limited to, chlorine compound-chlorine, iodine compound-iodine, bromine compound-bromine, thallium ion (III)-thallium ion (I), mercury ion (II)-mercury ion (I), ruthenium ion (III)-ruthenium ion (II), copper ion (II)-copper ion (I), iron ion (III)-iron ion (II), nickel ion (II)-nickel ion (III), vanadium ion (III)-vanadium ion (II), manganate ion-permanganate ion. In this case, these redox constituent materials function by being distinguished from a redox (oxidation-reduction) moiety in the porous body 4.

The redox constituent material may be immobilized on the electrode 2. Examples of the immobilization method include a method in which a carbon electrode used in a secondary battery, and the above structure materials are included in a polymer gel.

When the redox constituent material does not exist, an electrode reaction due to decomposition of the solvent occurs, and thus requiring replenishment of the solvent at any time. In this case, the solvent is preferably water which exists widely in the atmosphere.

In the case of water, there is exemplified a method in which water in the atmosphere is supplied, for example, using a peltier element.

The electrolyte dissolves in the solvent. The electrolyte is added into the solvent so that an ionic conductivity of the electrolyte 3 is improved.

Preferable electrolytes are, for example, tetrabutylammonium perchlorate, tetraethylammonium hexafluorophosphate, ammonium salts such as imidazolium salts, and pyridium salts; and alkali metal salts such as lithium perchlorate and potassium tetrafluoroborate. It is also possible to exemplify salts including alkali metals and alkali earth metals, such as lithium, sodium, potassium, and calcium, and organic compounds having an amino group as cations, and halogen ions such as chlorine and bromine ions, and sulfonium as anions.

It is more preferred that a supporting electrolyte salt of the electrolyte stabilizes carbonic acid ions or hydrogen carbonate ions, and has pH buffering capacity. Specific examples thereof include sodium hydrogen carbonate, sodium carbonate, acetic acid, and sodium acetate. It is possible to simultaneously contain a plurality of these supporting electrolyte salts.

The porous body 4 has a function of being positively charged, electrochemically, and thus performing adsorption of hydrogen carbonate ions or carbonic acid ions.

(Polymer Gel Body)

The porous body 4 is preferably a polymer gel body (a gel layer 6) which swells in the electrolyte 3.

In this case, the polymer gel body includes a redox moiety and a gel moiety in the molecule. The redox moiety is a moiety which is repeatedly oxidizable and reducible, that is, a moiety which reversibly becomes an oxidation state and a reduction state in a redox reaction. The redox moiety may be composed of a moiety which composes a pair of redox (oxidation-reduction) system consisting of an oxidation state and a reduction state. At least one of the oxidation state and the reduction state of the redox moiety is preferably a cationic compound. The gel moiety is a moiety which swells in an electrolyte to form a gel. The redox moiety is chemically bonded to the gel moiety. There is no particular limitation on the positional relationship between the redox moiety and the gel moiety in the molecule of the organic compound. For example, in case that a framework of a main chain of the molecule is formed by the gel moiety, the redox moiety is bonded to the main chain as a side chain. It may also be the structure in which a molecular framework forming the gel moiety and a molecular framework forming the redox moiety are alternately bonded. In this way, when the redox moiety and the gel moiety exist in the same molecule of the organic compound, the redox moiety may be likely to be held in a position where electrons are easily transported, in the gel layer 6. For example, the gel layer 6 preferably has an external shape such as a konjak-like (flabby) shape, or a shape like an ion exchange membrane, however, the shape is not limited thereto. The gel layer 6 becomes a cationic state in the redox process in either an oxidation state or a reduction state. When the gel layer 6 becomes the cationic state, it is possible to adsorb carbon dioxide in the form of carbonic acid ions or hydrogen carbonate ions.

A physical indicator, which exerts an influence on a size of a reaction interface formed in the gel layer 6, includes a degree of swelling. The degree of swelling is represented by the following equation.

Degree of swelling=(weight of gel)/(weight of gel dry body)×100

The gel dry body refers to a substance obtained by drying the gel layer 6. Drying of the gel layer 6 refers to removal of the solution, especially removal of the solvent, included in the gel layer 6. Examples of the method for drying the gel layer 6 include a method for removing the solution or solvent in a heat vacuum environment, and a method for removing the solution or solvent included in the gel layer 6 using other solvents.

In the case of removing the solution or solvent included in the gel layer 6 using other solvents, it is preferred to select a solvent, which has high affinity with the solution or solvent included in the gel layer, and is easily removed in the heat vacuum environment, for efficient removal of the solution or solvent included in the gel layer 6.

The degree of swelling of the gel layer 6 is preferably from 110 to 3,000%, and more preferably from 150 to 500%. When the degree of swelling is less than 110%, it may become impossible to sufficiently stabilize the redox moiety due to a decrease in the electrolyte component in the gel layer 6. In contrast, when the degree of swelling is more than 3,000%, carbon dioxide adsorptivity may deteriorate due to a decrease in the redox moiety in the gel layer 6. Therefore, in both cases, performances of the carbon dioxide adsorption and release device may deteriorate.

An organic compound including a redox moiety and a gel moiety in a molecule is represented, for example, by the following general formula:

where $(X_i)_n$ denotes a gel moiety, and $X_i$ denotes a monomer of a compound which forms the gel moiety. The gel moiety is formed, for example, of a polymer framework. The polymerization degree n of the monomer is preferably within a range from 1 to 100,000. Y denotes a redox moiety bonded to $(X_i)_n$. The symbols j and k are any integer denoting the number of $(X_i)_n$ and Y included in a molecule, respectively, and both of them are preferably within a range from 1 to 100,000. The redox moiety Y may be bonded to any moiety of the polymer framework which composes the gel moiety $(X_i)_n$.

More specific examples of the polymer gel structure include structures shown in the following chemical formulas (6) and (7).

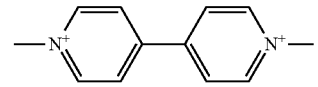

[Chemical Formula 6]

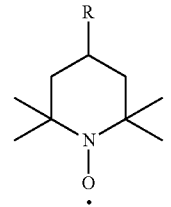

[Chemical Formula 7]

Examples of the counter anion A⁻ in the chemical formula (6) include anions selected from bromine ions, chlorine ions, perchloric acid ions, hexafluorophosphoric acid ions, and tetrafluoroboric acid ions.

In the case of the compound represented by the chemical formula (6), N⁺ (nitro cation) becomes N. (nitro radical) by application of a voltage, and carbonic acid ions or hydrogen carbonate ions are included in the polymer gel structure as the counter anion.

In the case of the compound represented by the chemical formula (7), N—O. (nitrosonium radical) becomes N⁺=O (nitrosonium cation) by application of a voltage, and carbonic acid ions or hydrogen carbonate ions are adsorbed in the polymer gel structure as the counter anion.

Examples of the method for synthesis of the polymer gel represented by the chemical formula (6) includes an electrolytic polymerization method.

In the synthesis of an organic compound by the electrolytic polymerization method, for example, an electrode 1 and a counter electrode are immersed in a solution containing a precursor. When a voltage is applied between the electrode 1 and the counter electrode in such state, the precursor is polymerized on the electrode 1 by an electrochemical reaction to precipitate an organic compound. The electrolytic polymerization method requires neither high-level facility nor high-level technology, like CVD, but exhibits high precipitation speed of an organic compound, and also enables suppression of the deposited organic compound from peeling from the electrode 1, and makes it easy for the organic compound to undergo densification and formation into a thin membrane. When the organic compound is densified, the redox moiety is densely disposed in the porous body 4, and thus the porous body 4 exhibits high electron transportability. When the organic compound composing the porous body 4 spreads three-dimensionally, stability of the organic compound increases. Furthermore, solubility of the organic compound in the solvent decreases, and thus widening room for choice of the solvent of the electrolyte.

The organic compound thus obtained includes, as the redox moiety, a pyridium structural unit shown in the chemical formula (6). The pyridium structural unit is formed by eliminating a substituent represented by M (wherein M is a halogen group such as a fluorine, chlorine, bromine, or iodine group, or a cyano group) from a moiety having a structure shown in chemical formula (8) of a precursor through electrolytic polymerization, and mutually bonding the positions where the substituent represented by M in the moiety is eliminated.

[Chemical Formula 8]

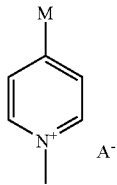

When the unit of the pyridium structure is subjected to one-electron reduction, pyridium cation radicals are formed, and also when subjected to one-electron reduction, pyridium diradicals are formed. To the contrary, when pyridium diradicals are subjected to one-electron oxidation, pyridium cation radicals are formed, and also when subjected to one-electron oxidation, pyridium cation radicals return to an original pyridium structural unit. In this way, the organic compound repeatedly exhibits stable redox capacity. When the organic compound undergoes a radical state upon oxidation and reduction, very quick electron self-exchange reaction may arise, and thus causing giving or receiving of electrons between organic compounds. The radical state of the organic compound upon oxidation and reduction is observed, for example, by electron spin resonance (ESR).

When the precursor includes a plurality of moieties each having a structure shown in the chemical formula (8) in a molecule, it is possible to form a high molecular weight organic compound by electrolytic polymerization of the precursor. In order to increase the molecular weight of the organic compound, the precursor preferably has two or more, and more preferably three or more structures shown in the chemical formula (8) in a molecule.

Specific compounds and synthetic methods are disclosed in Langmuir, Vol. 17, No. 1, 2001 155-.

The porous body 4 is formed by depositing an organic compound formed by electrolytic polymerization of the precursor on the electrode 1. In the formation of the porous body 4, first, for example, the electrode 1 is immersed in a solution containing the precursor. When the precursor is polymerized by electrolytic polymerization in such state on the electrode 1 to form an organic compound, the porous body 4 is formed on the electrode 1. The electrode potential of the electrode 1 upon electrolytic polymerization is adjusted to the potential lower than a reduction potential of the precursor. Whereby, electrons become movable in the organic compound having properties of an n-type semiconductor on the electrode 1, and thus electrolytic polymerization proceeds.

Since the molecular weight of the organic compound formed by electrolytic polymerization is increased, the porous body 4 formed by electrolytic polymerization of the precursor exhibits high durability. The porous body 4 with high density is formed by subjecting to electrolytic polymerization. Therefore, it is expected that carbon dioxide adsorptivity in the porous body 4 is improved.

It is possible to use, as specific compounds and synthetic methods of the polymer gel body including a redox moiety, radical compounds and synthetic methods disclosed in JP 2007-70384 A.

When using such polymer gel structure, it is preferred that the polymer gel body is included in a highly conductive substance having high porosity which is called a collector.

When the collector exists, it becomes possible to perform membrane thickening by securing low electron transportability of the polymer gel body by the highly conductive material, and thus enabling an improvement in the adsorption amount of carbon dioxide per one device.

Examples of the substance composing the collector include metals such as platinum, gold, silver, copper, aluminum, rhodium, and indium; carbon materials such as graphite, carbon nanotube, and carbon including platinum supported thereon; conductive metal oxides such as indium-tin complex oxide, tin oxide doped with antimony, and tin oxide doped with fluorine; and conductive polymers such as polyethylenedioxythiophene, polypyrrole, and polyaniline. These particles may have a spherical shape. More preferably these particles are composed of a substance having a high aspect ratio. The substance having a high aspect ratio can have a structure having high current collecting effect in a state of high porosity.

(Conductive Polymer Porous Body)

The porous body 4 is preferably a conductive polymer porous body.

In the case of the porous polymer, a polymer having conductivity is formed on the electrode 1 in a porous state, and thus carbonic acid ions or hydrogen carbonate ions are adsorbed in a cation site formed by being electrochemically oxidized or reduced. Examples of the porous polymer include conductive polymers such as polyaniline and polypyrrole. Polyaniline is excellent in stability against air oxidation as compared with a linear conjugated polyacetylene and is put into practice as a positive electrode material in which lithium aluminum of a secondary battery is used as a material of a counter electrode. There have been made a study on various applications, as other application, for example, electrochromic materials, carries of immobilized enzymes, surface-coated material for suppressing photodissolution of semiconductors, transistors, coating materials of semiconductor electrodes using an electron transfer catalytic action, photo-electrochemical reduction catalysts of carbon dioxide, and electrode materials which exhibit photoelectric response.

Examples of the synthetic method include the method disclosed in Japanese Patent Application No. 4-11458.

At this time, the method for producing polyaniline is preferably an electrolytic polymerization method. In the case of a membrane formed by electrolytic polymerization, formation of the membrane proceeds in a state where conductive paths are secured, and thus obtaining a polyaniline membrane in which the entire aniline sites are active.

The method of electrolytic polymerization may be either a potentiostatic method or a potential sweep method.

Counter anions, which ensure cation sites of the polymer porous body in the present invention, are preferably hydrogen carbonate ions or carbonic acid ions.

The ratio of the counter anion is preferably from 10 to 99, and more preferably from 100 to 10,000, on the assumption that the total number of moles of other counter anions is 1.

(Inorganic Porous Body)

The porous body 4 may be an inorganic porous body.

In the case of the inorganic porous body, the porous surface thereof is filled with plus or minus charges upon application of a voltage, and then carbon dioxide is adsorbed to an inorganic porous body or desorbed from the inorganic porous body, as counter anions, in the form of hydrogen carbonate ions or carbonic acid ions.

Specific examples of the constituent material include a carbon-based electrode using an activated carbon or a carbon fiber, high porosity electrode using a needle-shaped conductive material, or a carbon nanotube. A composite thereof may be used.

It is also possible to support a predetermined catalyst on these conductive materials. It is possible to employ, as the catalyst to be supported, for example, a platinum catalyst, a silver catalyst, a platinum ruthenium catalyst, and a cobalt catalyst.

The porous body 4 preferably has a thickness within a range from 0.001 to 10 cm. When the thickness is not more than the above range, the adsorption amount of carbon dioxide may become insufficient. In contrast, when the thickness is not less than the above range, absorption and release rate of carbon dioxide may decrease.

In the carbon dioxide adsorption and release device configured as described above, the porous body 4 has an excellent carbon dioxide adsorptivity and also filling of carbonic acid ions or hydrogen carbonate ions is quickly performed by the electrolyte 3.

That is, the porous body 4 is filled and adsorbed with carbon dioxide in the form of hydrogen carbonate ions or carbonic acid ions by applying a voltage in a state where the electrolyte 3 contains carbon dioxide. Next, in case that a backward voltage is applied, release of carbon dioxide in the electrolyte 3 from the porous body 4 enables release of carbon dioxide.

EXAMPLES

The present invention will be specifically described below by way of Examples.

Example 1

A conductive glass substrate measuring 1 mm in thickness, 21 mm in length and 24 mm in width, including a fluorine-doped tin oxide film (having 10Ω/□, manufactured by ASAHI GLASS CO., LTD.) was prepared. The fluorine-doped tin oxide film was used as an electrode 1. Using an electrochemical oxidation method (an electrolytic polymerization method), polyaniline was precipitated as a porous body 4 on a substrate 1 in a thickness of 1 μm. Separately, a conductive glass substrate measuring 1 mm in thickness, 21 mm in length and 24 mm in width, including a fluorine-doped tin oxide film (having 10Ω/□, manufactured by ASAHI GLASS CO., LTD.) was prepared and platinum was deposited on the fluorine-doped tin oxide film by a sputtering method, and the obtained laminate was used as an electrode 2. The porous body 4 and the electrode 2 were disposed so as to face each other, and then a hot-melt adhesive measuring 1 mm in width and 50 μm in thickness (BYNEL, manufactured by DuPont) was interposed in the outer peripheral portion between both the porous body and the electrode. The porous body 4 and the electrode 2 were bonded to each other through a use of the hot-melt adhesive by pressurizing while heating the hot-melt adhesive. Furthermore, 4-hydroxy-2,2,6,6-tetramethylpiperidine-1-oxyl (OH-TEMPO) was dissolved in water in the concentration of 0.5M, and potassium chloride was dissolved in the concentration of 0.5 mol/l to prepare an electrolyte. The electrolyte was injected into a space between the electrode 2 and the porous body 4 through a hole for injection/release of carbon dioxide, and thus producing an element. In this case, a method for synthesizing polyaniline (an electrochemical oxidation method) was performed in accordance with the method disclosed in E. M. Genies, Mol. Cryst. Liq. Cryst., 121, 181-186 (1985). With respect to the obtained element, carbon dioxide adsorption and desorption performances were evaluated.

Example 2

The configuration of Example 2 differs from that of Example 1 only in terms of the porous body 4, and other configurations are similar to Example 1.

The porous body 4 was produced by the following method.

An electrolytic manganese dioxide ($MnO_2$, positive electrode active material) subjected to a heat treatment at 400° C., acetylene black (a conducting agent), polyethylene oxide having an average molecular weight of 100,000 (having a viscosity average molecular weight of 100,000, manufactured by Sigma-Aldrich Corporation) as a binder, and LiN$(CF_3SO_2)_2$ were dissolved and dispersed in acetonitrile, followed by kneading to prepare a pasty positive electrode mix. The above components were mixed in a mixing ratio ($MnO_2$:acetylene black:polymer electrolyte=70% by mass:20% by mass:10% by mass). The mass of the polymer electrolyte was mass in terms of solid content. The obtained pasty positive electrode mix was applied to an electrode and dried at 1,200° C. for 24 hours, followed by rolling using a roll press to produce a porous body 4. With respect to the obtained element, carbon dioxide adsorption and desorption performances were evaluated in the same manner as in Example 1.

Comparative Example 1

The porous body 4 in Example 1 was formed by zeolite.

Ferrierite (a peak of pore size distribution is about 4.5 angstroms, and a molar ratio of $SiO_2/Al_2O_3$ is about 90) was used as zeolite. Zeolite was supported on the electrode in the amount of 50 g/m² to form a porous body 4. The sizes of the porous body 4 and electrodes 1, 2, and the distance between the electrode 2 and porous body 4 are the same as those in Example 1.

The carbon dioxide adsorption and release device 1 was adsorbed with carbon dioxide by applying 900 kPa. The amount of zeolite supported was 12% by weight/1 g of Zeolite. Next, adsorbed $CO_2$ was released by firing at a temperature of 400° C. The release amount was calculated by the following calculation equation.

Release amount=(weight before firing)−(weight after firing)

TABLE 1

| | Materials which compose porous body 4 | Adsorptivity (ml/g) | Consumption energy (mwh/ml) |
|---|---|---|---|
| Example 1 | Polymer porous body | 261 | 1.1 |
| Example 2 | Porous inorganic substance | 410 | 2.1 |
| Comparative Example 1 | Zeolite | 63 | 131 |

As shown in the results, an adsorptivity is 63 (ml/g) and a consumption energy is 131 (mwh/ml) in Comparative Example 1, and thus failing to reconcile the adsorptivity and the consumption energy. In contrast, the adsorptivity is 261 (ml/g) and the consumption energy is 1.1 (mwh/ml) (Example 1), and the adsorptivity is 410 (ml/g) and the consumption energy is 2.1 (mwh/ml) (Example 2) in Examples 1 to 2, and thus making it possible to reconcile the adsorptivity and the low energy consumption.

DESCRIPTION OF REFERENCE NUMERALS

1: Electrode
2: Electrode
3: Electrolyte
4: Porous body

What is claimed is:

1. A carbon dioxide adsorption and release device, comprising:
    first and second electrodes provided opposite to each other;
    an electrolyte, comprising a solvent that dissolves carbon dioxide into carbonic ions or hydrogen carbonate ions, filled between the first and second electrodes; and
    a porous body, throughout which the solvent is present, provided on one of the first and second electrodes.

2. The carbon dioxide adsorption and release device according to claim 1, wherein the porous body includes a unit A which is reversibly oxidizable and reducible by application of a voltage to a pair of electrodes, and either of an oxidation state and a reduction state of the unit A is an organic polymer which can be converted to a cationic state.

3. The carbon dioxide adsorption and release device according to claim 2, wherein the porous body is a polymer gel which swells in the electrolyte.

4. The carbon dioxide adsorption and release device according to claim 3, wherein, in the porous body, the unit A is represented by the following structural formula:

[Chemical Formula 1]

[Chemical Formula 2]

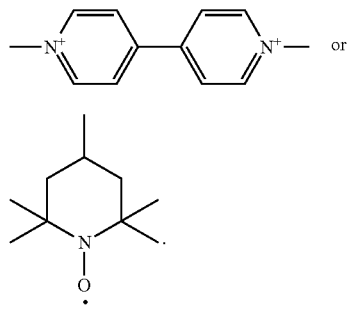

5. The carbon dioxide adsorption and release device according to claim 4, wherein the porous body is represented by the following structural formula:

[Chemical Formula 3]

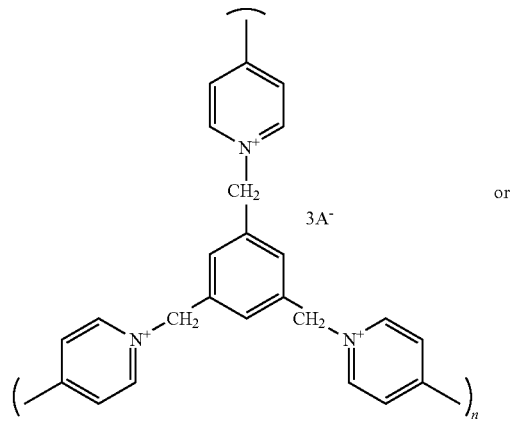

[Chemical Formula 4]

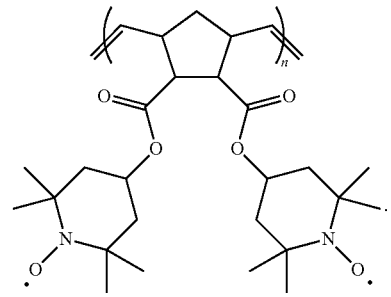

6. The carbon dioxide adsorption and release device according to claim 2, wherein the porous body is a conductive polymer porous body.

7. The carbon dioxide adsorption and release device according to claim 6, wherein, in the porous body, the unit A is polyaniline represented by the following structure formula:

[Chemical Formula 5]

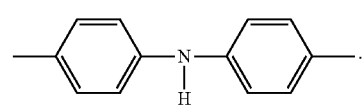

8. The carbon dioxide adsorption and release device according to claim 1, wherein the porous body is a conductive inorganic porous body.

9. The carbon dioxide adsorption and release device according to claim 8, wherein the conductive inorganic porous body is at least one selected from the group consisting of a graphite, a carbon nanotube, and a carbon fiber.

10. The carbon dioxide adsorption and release device according to claim 2, wherein the unit A included in the porous body has a density of 0.0002 mol/g to 0.02 mol/g.

11. The carbon dioxide adsorption and release device according to claim 1, wherein a solvent of the electrolyte is water.

12. The carbon dioxide adsorption and release device according to claim 1, wherein the electrolyte contains a supporting electrolyte salt.

13. The carbon dioxide adsorption and release device according to claim 12, wherein a cation of the supporting electrolyte salt has a molecular weight of 1,000 or more.

14. The carbon dioxide adsorption and release device according to claim 12, wherein an anion of the supporting electrolyte salt has a molecular weight of 1,000 or more.

* * * * *